United States Patent
Miyakawa et al.

(10) Patent No.: US 6,849,213 B2
(45) Date of Patent: Feb. 1, 2005

(54) METHOD FOR PRODUCING SILICON NITRIDE FILTER

(75) Inventors: Naomichi Miyakawa, Yokohama (JP); Nobuhiro Shinohara, Yokohama (JP); Kanji Arai, Yokohama (JP); Hideo Takahashi, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 135 days.

(21) Appl. No.: 10/216,815

(22) Filed: Aug. 13, 2002

(65) Prior Publication Data

US 2003/0006518 A1 Jan. 9, 2003

Related U.S. Application Data

(60) Division of application No. 09/935,666, filed on Aug. 24, 2001, now Pat. No. 6,565,797, and a continuation of application No. PCT/JP00/09049, filed on Dec. 20, 2000.

(30) Foreign Application Priority Data

Dec. 24, 1999 (JP) ............................................ 11-366305
Dec. 24, 1999 (JP) ............................................ 11-366306

(51) Int. Cl.$^7$ ............................................. B29C 65/00
(52) U.S. Cl. ...................... 264/44; 264/628; 264/646; 264/647
(58) Field of Search ........................ 264/44, 628, 646, 264/647

(56) References Cited

U.S. PATENT DOCUMENTS

| | | | | |
|---|---|---|---|---|
| 4,388,255 A | * | 6/1983 | Simpson | |
| 4,923,829 A | * | 5/1990 | Yasutomi et al. | |
| 5,004,709 A | | 4/1991 | Strandford et al. | |
| 5,103,239 A | | 4/1992 | Verzemnieks et al. | |
| 5,203,886 A | * | 4/1993 | Sheldon et al. | |

FOREIGN PATENT DOCUMENTS

| | | |
|---|---|---|
| EP | 784038 A2 | 7/1997 |
| GB | 1 490 543 | 11/1977 |
| GB | 2 105 316 A | 3/1983 |
| WO | WO 88/00933 | 2/1988 |
| WO | WO 96-20144 | 7/1996 |

OTHER PUBLICATIONS

XP0000055029, 6001 Chemical Abstracts 107 (1987) Dec. No. 26, Columbus, Ohio, USA, p. 290.

* cited by examiner

*Primary Examiner*—Christopher A. Fiorilla
(74) *Attorney, Agent, or Firm*—Oblon, Spivak, McClelland, Maier & Neustadt, P.C.

(57) ABSTRACT

A method for producing a silicon nitride filter including heat-treating in nitrogen a green body containing from 40 to 90% of metal silicon particles having an average particle diameter of from 1 to 200 μm and from 10 to 60% of a pore-forming agent, where the total amount of the metal silicon particles and the pore-forming agent is at least 90%, forms a porous product made substantially of silicon nitride.

21 Claims, No Drawings

METHOD FOR PRODUCING SILICON NITRIDE FILTER

This application is a divisional of Ser. No. 09/935,666 filed Aug. 24, 2001, now U.S. Pat. No. 6,565,797 and is a continuation of PCT/JP00/09049 filed Dec. 20, 2000.

TECHNICAL FIELD

The present invention relates to a silicon nitride filter suitable for removing dust, etc. contained in a high temperature exhaust gas, and a method for its production.

BACKGROUND ART

Heretofore, a cordierite type ceramic filter or silicon carbide type ceramic filter has been proposed as a filter to remove dust, etc. contained in a high temperature exhaust gas. However, the cordierite type ceramic filter is not necessarily adequate from the viewpoint of heat resistance and corrosion resistance although it is excellent in thermal shock resistance, and the silicon carbide type ceramic filter is not necessarily adequate with respect to the thermal shock resistance, although it is excellent in heat resistance and corrosion resistance.

Particularly when the ceramic filter is one intended for arresting diesel particulates (hereinafter referred to simply as particulates) discharged from a diesel engine (hereinafter referred to simply as an engine), it has been likely with the above-mentioned cordierite type filter or the silicon carbide type filter that the particulates arrested by the filter will locally burn to cause a melting loss, thus presenting a fatal damage to the ceramic filter. Further, the particulates contain a sulfur content and a phosphor content, whereby acid resistance is required, but the cordierite type filter used to be not necessarily adequate with respect to the acid resistance.

On the other hand, silicon nitride has excellent characteristics with respect to heat resistance, thermal shock resistance, corrosion resistance, acid resistance, mechanical strength, etc., and is expected to be useful as a filter for dust arresting or dust removing in a high temperature or corrosive environment. Especially, silicon nitride is excellent in heat resistance, thermal shock resistance, acid resistance and mechanical strength, and is thus considered to be a material suitable for a filter for particulates.

As a method for producing such a silicon nitride filter, several have been proposed.

For example, JP-A-6-256069 proposes a method of firing a green body comprising silicon nitride particles, clay and an oxide. Further, JP-A-7-187845, JP-A-8-59364 and JP-A-6-24859 propose methods of using as starting materials a mixture comprising silicon nitride particles and an organic silicon compound, a mixture comprising silicon nitride particles and a polysilazane and a mixture comprising silicon nitride particles and a synthetic resin foam, respectively. However, such methods of using silicon nitride particles as starting materials have had a problem that as compared with a method of using metal silicon particles as the starting material and converting it to silicon nitride by direct nitriding, pores with pore diameters of at most 1 $\mu$m are little, whereby the Young's modulus is high, the thermal shock resistance tends to be poor, the production cost tends to be problematic since the silicon nitride particles are relatively expensive.

On the other hand, as a method of employing metal silicon particles, JP-A-1-188479 proposes a production method to obtain a porous product having a nitriding ratio of the metal silicon particles of at most 50%, by using as a starting material a mixture comprising metal silicon particles and silicon nitride particles. However, in this method, the nitriding ratio of the metal silicon particles is at most 50%, whereby there will be a substantial amount of silicon metal remaining in the silicon nitride sintered body in the form of metal silicon without being nitrided, whereby there will be a problem such that excellent heat resistance or corrosion resistance of silicon nitride will be impaired.

Further, by the method of using metal silicon particles, sintering of the formed silicon nitride particles is usually not sufficient, whereby the mechanical strength of the porous body thereby obtained, tends to be inadequate.

DISCLOSURE OF THE INVENTION

The present invention provides a method for producing a silicon nitride filter, which comprises heat-treating in nitrogen a green body comprising from 40 to 90 mass % (hereinafter referred to simply as %) of metal silicon particles having an average particle diameter of from 1 to 200 $\mu$m and from 10 to 60% of a pore-forming agent, provided that the total amount of the metal silicon particles and the pore-forming agent is at least 90%, to form a porous product made substantially of silicon nitride.

Another invention of the present invention provides a silicon nitride filter characterized in that the porosity is from 40 to 70%, and the cumulative pore volume of pores with diameters of at most 1 $\mu$m is from 1 to 15 vol % of the total pore volume.

BEST MODE FOR CARRYING OUT THE INVENTION

In the method for producing a silicon nitride filter of the present invention, a green body is used which comprises from 10 to 60% of a pore-forming agent and from 40 to 90% of metal silicon particles having an average particle diameter of from 1 to 200 $\mu$m, provided that the total amount of the metal silicon particles and the pore-forming agent is at least 90%.

If the pore-forming agent is less than 10%, the proportion of pores to perform a filter function tends to be inadequate, and if the pore-forming agent exceeds 60%, no adequate strength tends to be obtained, although the porosity of the filter becomes large. Further, if the average particle diameter of the metal silicon particles is less than 1 $\mu$m, the amount of moisture or oxygen adsorbed from outside air during e.g. preparation of the green body tends to increase, and when heat treated, the metal silicon particles tend to be oxidized before being nitrided, whereby the amount of silicon dioxide formed, tends to be too large. Further, if the average particle diameter of the metal silicon particles exceeds 200 $\mu$m, metal silicon particles not nitrided tend to remain in the interior of the sintered body even after the heat treatment, whereby the properties as the silicon nitride filter tend to deteriorate. If the metal silicon particles are less than 40%, the merits of using metal silicon particles, i.e. the merit of using the direct nitriding reaction of metal silicon, will not be utilized. On the other hand, if the content of the metal silicon particles exceeds 90%, the content of the pore-forming agent tends to be small, whereby the porosity cannot be made large. The purity of the metal silicon particles may suitably be selected depending upon the purpose and application.

In this specification, the pore-forming agent is not particularly limited so long as it forms pores. The pore-forming agent may, for example, be one which flies upon e.g.

decomposition during heat treatment, to form pores (hereinafter referred to as a flying-type pore-forming agent) or oxide ceramic hollow particles.

The heat-treating conditions are preferably two-step heat treatment in a nitrogen atmosphere, which is divided into a first step suitable for nitriding metal silicon particles and a second step suitable for sintering silicon nitride particles as formed nitride.

As the heat-treating conditions of the first step, it is preferred to maintain in a nitrogen atmosphere from 1000 to 1400° C. for from 4 to 24 hours. If the temperature is lower than 1000° C., nitriding of metal silicon particles tends to hardly take place. On the other hand, if the temperature exceeds 1400° C., the metal silicon particles will melt in the vicinity of the melting point (1410° C.) of metal silicon, whereby the shape cannot be maintained, such being undesirable. If the temperature maintaining time is less than 4 hours, nitriding of metal silicon particles tends to be inadequate, such being undesirable. Further, if the temperature maintaining time exceeds 24 hours, the nitriding reaction will no more substantially proceed, and the operation cost increases, such being undesirable.

As heat-treating conditions of the second step, it is preferred to maintain in a nitrogen atmosphere at from 1450 to 1800° C. for from 1 to 12 hours. If the temperature is lower than 1450° C., sintering of the silicon nitride particles tends to hardly proceed, such being undesirable, and if it exceeds 1800° C., the silicon nitride particles tend to be decomposed, such being undesirable. If the temperature maintaining time is less than 1 hour, bonding of the particles to one another will not adequately proceed, such being undesirable. On the other hand, if it exceeds 12 hours, silicon nitride tends to be decomposed, such being undesirable. The heat treatment of the first step and the heat treatment of the second step may be carried out continuously without lowering the temperature or the temperature may be once lowered at an intermediate point.

The temperature raising rate at the time of the heat treatment may suitably be selected depending upon the size, shape, etc. of the green body. However, it is preferably from 50 to 600° C./hr from the viewpoint of the nitriding ratio and the pore diameter. Even in a process of temperature raising, if the temperature is within a temperature range prescribed for the first step or the second step, the time passed will be included in the maintaining time for the first step or the second step.

Here, the nitrogen atmosphere is an atmosphere containing substantially solely nitrogen without containing oxygen, but it may contain other inert gas. The nitrogen partial pressure is preferably at least 50 kPa.

In the method for producing a silicon nitride filter of the present invention, the pore-forming agent is preferably oxide ceramic hollow particles. The method for producing a silicon nitride filter of the present invention wherein the pore-forming agent is oxide ceramics, will hereinafter be referred to as method 1.

In method 1, it is preferred to use a green body which comprises from 15 to 50% of oxide ceramic hollow particles and from 40 to 85% of metal silicon particles having an average particle diameter of from 5 to 200 μm, provided that the total amount of the oxide ceramic hollow particles and the metal silicon particles, is at least 90%.

Oxide ceramic hollow particles (hereinafter referred to as hollow particles) may be any particles so long as they are capable of forming pores during the heat treatment and they serve as a sintering aid to the silicon nitride particles formed in the heat-treating step.

It is preferred that the hollow particles contain as the main component an oxide of at least one metal selected from the group consisting of Al, Si, Ca, Sr, Ba and Mg, since the effect as a sintering aid is thereby high.

The hollow particles may have outer skin portion being dense or porous so long as they are hollow. Further, the hollow particles are preferably spherical particles, as they are readily available, but particles other than spherical particles may be employed so long as they are hollow.

The average particle diameter of the hollow particles is preferably from 30 to 200 μm, whereby the porosity of the filter to be obtained, will be large, and the strength will be secured. If the average particle diameter of the hollow particles is less than 30 μm, the contribution to formation of pores will decrease. On the other hand, if the average particle diameter exceeds 200 μm, the strength of the filter to be obtained tends to be inadequate, such being undesirable. The content of the hollow particles is preferably from 15 to 50% of the green body.

With the metal silicon particles to be used in method 1, the average particle diameter is preferably from 5 to 200 μm, more preferably from 30 to 150 μm.

In method 1, the total amount of the hollow particles and the metal silicon particles will be at least 90% in the green body.

In method 1, a common mixing means such as a ball mill or a mixer may be employed for mixing the hollow particles and the metal silicon particles, and a common ceramic-forming method such as press molding, extrusion molding or slip casting, may suitably be employed as a method for preparing a green body comprising hollow particles and metal silicon particles. Further, at the time of molding, an organic binder may be incorporated. As such an organic binder, an organic substance such as polyvinyl alcohol or its modified product, starch or its modified product, carboxymethylcellulose, hydroxylmethylcellulose, polyvinyl pyrrolidone, an acrylic resin or an acrylic copolymer, a vinyl acetate resin or a vinyl acetate copolymer, may, for example, be employed. The amount of such an organic binder is preferably from 1 to 10 parts by mass (hereinafter referred to simply as parts) per 100 parts of the green body.

As conditions for heat treating the above green body, it is preferred that the heat-treating conditions of the first step are to maintain the green body in a nitrogen atmosphere at from 1200 to 1400° C. for from 4 to 12 hours, and the heat-treating conditions of the second step are to maintain it in a nitrogen atmosphere at from 1500 to 1800° C. for 1 to 12 hours.

The porosity of the silicon nitride filter obtained by method 1, is preferably from 30 to 80%. The porosity is measured by an Archimedean method. If the porosity is less than 30%, the pressure loss tends to be large, such being undesirable as a filter. On the other hand, if the porosity exceeds 80%, the strength tends to be low, such being undesirable as a filter.

The average pore diameter as measured by a mercury immersion method of the silicon nitride filter obtained by method 1, is preferably from 5 to 40 μm. If the average pore diameter is less than 5 μm, the pressure loss during the use of the filter tends to be large, such being undesirable. If the average pore diameter exceeds 40 μm, arresting and removing fine exhaust particles such as diesel particulates tend to be difficult, such being undesirable.

In the method for producing a silicon nitride filter of the present invention, the pore-forming agent is preferably a flying-type pore-forming agent. The method for producing a silicon nitride filter of the present invention wherein the pore-forming agent is a flying-type pore-forming agent, will be hereinafter referred to as method 2.

In method 2, it is preferred to use a green body which comprises from 10 to 50% of the flying-type pore-forming agent and from 40 to 90% of metal silicon particles having an average particle diameter of from 1 to 30 μm, provided that the total amount of the flying-type pore-forming agent and the metal silicon particles is at least 90%.

As the flying-type pore-forming agent, either an organic substance or an inorganic substance may be suitably employed so long as it is capable of flying upon e.g. decomposition during the heat treatment, to form pores. It is preferred that the flying-type pore-forming agent is organic polymer particles, particularly heat decomposable polymer particles, since they will decompose and fly in the heat treatment process without leaving any residue in the sintered body, whereby properties of the obtainable silicon nitride porous product will not be impaired.

As such an organic polymer, polyvinyl alcohol, an acrylic resin, a vinyl acetate resin or cellulose, may, for example, be mentioned. If organic polymer particles added as a flying-type pore-forming agent during the temperature raising will not sufficiently be heat-decomposed in the temperature raising step in the heat treatment and will remain in a substantial amount as carbon, silicon carbide will be formed in the subsequent heat treating process, whereby pores are likely to be clogged, such being undesirable. From this viewpoint, it is preferred to use acrylic resin particles as a flying-type pore-forming agent, whereby it is readily heat decomposable, and the amount remaining as carbon will be little.

The content of the flying-type pore-forming agent is preferably from 10 to 50% in the green body, more preferably from 15 to 40%, whereby both the strength and porosity of the filter can be made high.

Further, it is particularly preferred that the flying-type pore-forming agent is spherical, whereby pores to be formed will also be spherical, and deterioration of the strength can be suppressed even when the porosity is made high. Further, when the flying-type pore-forming agent is spherical, the average particle diameter is preferably from 20 to 100 μm. If the average particle diameter of the flying-type pore-forming agent is less than 20 μm, the average pore diameter of the silicon nitride filter obtained after the heat treatment will be not higher than 5 μm, such being undesirable. On the other hand, if it exceeds 100 μm, the average pore diameter of the silicon nitride filter obtained after the heat treatment will be at least 20 μm, such being undesirable as a filter for e.g. dusts.

The metal silicon particles to be used in method 2 preferably have an average particle diameter of from 1 to 30 μm. The content of the metal silicon particles is preferably from 40 to 90%, more preferably from 50 to 80%, in the green body. In method 2, the total amount of the flying-type pore-forming agent and the metal silicon particles is at least 90% in the green body. If the total amount of the flying-type pore-forming agent and the metal silicon particles, is less than 90% in the green body, it is impossible to obtain a filter having the desired properties.

In method 2, as a method for forming a green body comprising the flying-type pore-forming agent and the metal silicon particles, a usual ceramic molding method as mentioned above, may suitably be employed. Further, at the time of the molding, an organic binder may be added separately from the flying-type pore-forming agent. As such an organic binder, the above-mentioned binder may preferably be employed. The amount of such an organic binder is preferably from 1 to 10 parts per 100 parts of the green body. Further, the flying-type pore-forming agent may serve as a binder for the green body.

In method 2, the heat-treating conditions of the first step are preferably such that the green body is maintained in a nitrogen atmosphere at from 1100 to 1400° C. for from 5 to 24 hours. Further, the heat-treating conditions of the second step are preferably such that the green body is maintained in a nitrogen atmosphere at from 1450 to 1800° C. for from 2 to 5 hours.

The porosity of the silicon nitride filter obtained by method 2, is preferably from 30 to 80%. The porosity is measured by an Archimedean method. If the porosity is less than 30%, the pressure loss becomes large, such being undesirable as a filter. Further, if the porosity exceeds 80%, the strength tends to be low, such being undesirable as a filter.

The average pore diameter as measured by a mercury immersion method of the silicon nitride filter obtained by method 2, is preferably from 5 to 20 μm. If the average pore diameter is less than 5 μm, the pressure loss during use of the filter tends to be large, such being undesirable. If the average pore diameter exceeds 20 μm, it tends to be difficult to arrest and remove fine exhaust particles such as particulates, such being undesirable.

The ratio (hereinafter referred to as the nitriding ratio) of silicon contained as silicon nitride to total silicon of metal silicon of the silicon nitride filter obtained by method 2, is preferably at least 90%. If the nitriding ratio is less than 90%, the properties such as heat resistance and corrosion resistance of the silicon nitride filter will be low due to the remaining metal silicon particles, such being undesirable.

In this specification, the nitriding ratio of silicon nitride is calculated from the change in mass. Namely, the reaction for formation of silicon nitride is such that as shown by the formula 1, 3 mols of metal silicon will react with 2 mols of nitrogen to form 1 mol of silicon nitride.

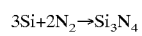

$$3Si+2N_2 \rightarrow Si_3N_4 \qquad \text{Formula 1}$$

From the formula 1, if metal silicon is all converted to silicon nitride, the mass will be 1.67 times ((3×Si+4×N)/(3× Si)=(3×28+4×14)/(3×28)=1.67). If the change in mass is α-times, the nitriding ratio is calculated from (α−1)/(1.67−1)=(α−1)/0.67. For example, if it is 1.37 times, the nitriding ratio will be 55% (0.37/0.67×100=55%).

The silicon nitride filter of the present invention (hereinafter referred to as the present filter) is characterized in that the porosity is from 40 to 70%, and the cumulative pore volume of pores with diameters of at most 1 μm is from 1 to 15 vol % of the total pore volume. The present filter preferably has a Young's modulus of from 20 to 100 GPa and a thermal expansion coefficient of at most 4×10⁻⁶/° C. The thermal expansion coefficient is a value within a temperature range of from room temperature to 1000° C.

The porosity of the present filter is from 40 to 70%. If the porosity is less than 40%, the pore volume will be too small, and the pressure loss will increase. On the other hand, if it exceeds 70%, the mechanical strength as a filter tends to be inadequate.

The ratio of the cumulative pore volume of pores with diameters of at most 1 μm in the total pore volume (hereinafter referred to simply as a 1 μm pore volume ratio) is from 1 to 15 vol %. If the 1 μm pore volume ratio is less than 1 vol %, the Young's modulus will be high, and the thermal shock resistance will deteriorate. Further, if the 1 μm pore volume ratio exceeds 15 vol %, the pressure loss of the filter tends to increase, or the mechanical strength tends to be low. Preferably, the 1 μm pore volume ratio is from 5 to 10 vol %.

The Young's modulus of the present filter is preferably from 20 to 100 GPa. If the Young's modulus is less than 20 GPa, the mechanical strength of the filter material tends to be too low. On the other hand, if it exceeds 100 GPa, the thermal stress generated by thermal shock tends to be large, whereby thermal shock resistance tends to deteriorate, such being undesirable.

In this specification, the pore volume is measured by a mercury immersion method, and the Young's modulus is calculated from Young's modulus E (Pa)=σ/ε, by measuring the stress σ (Pa) and the strain ε, by the tensile strength measurements. The method for measuring the strain may, for example, be a method of using a strain gage.

For the measurement of the Young's modulus, the sample size is 1×1×6 cm, and the longitudinal direction is the tensile direction. The tensile load is applied at 0.5 mm/min. In a case where the sample is a honeycomb, it is cut out so that the above-mentioned longitudinal direction will be the extrusion direction during the molding i.e. will be in parallel with the through holes, and at both ends, holes were firmly sealed with e.g. an acrylic resin adhesive or an epoxy type resin adhesive for from 5 to 10 mm from the end surfaces. The strain is measured by attaching a strain gage to the sample.

The above-mentioned method 1 or method 2 is preferably employed as a method for producing the present filter.

EXAMPLES

Further, pores were measured by a mercury porosimeter (AUTOSCAN-33, trade name, manufactured by Yuasa Ionics K.K.).

Example 1 (Present Invention)

To 70 parts of metal silicon particles having an average particle diameter of 50 μm, 30 parts of alumina type hollow particles having an average particle diameter of 50 μm were added, and ethanol was further added as a disperse medium, followed by wet mixing for 30 minutes by a ball milling method and finally by drying. The obtained mixed powder was filled into a 40 mm×60 mm press mold, followed by uniaxial press molding under a pressing pressure of 20 MPa. After the molding, the green body was heated from room temperature to 1300° C. at a rate of 400° C./hr in a nitrogen atmosphere (nitrogen pressure=0.1 MPa) in an atmosphere-controlled electric furnace (hereinafter referred to simply as an electric furnace) and maintained at 1300° C. for 8 hours, and then it was heated to 1700° C. at a rate of 60° C./hr and maintained at 1700° C. for 5 hours for heat treatment.

The obtained sintered body had a porosity of 65% and an average pore diameter of 20 μm. With respect to this porous product, identification of the crystal phases was carried out by X-rays, whereby only silicon nitride was observed. With respect to this porous product, the thermal expansion coefficient was measured, and it was a low thermal expansion of $3.0 \times 10^{-6}/°$ C. within a range of from room temperature to 1000° C. Further, from the sintered body, a bending test specimen of a size of 4 mm×3 mm×40 mm was cut out, and the three point bending strength with a span of 30 mm was measured at room temperature. The load applying rate was 0.5 mm/min. As a result, the bending strength was 50 MPa.

Example 2 (Comparative Example)

The operation was the same as in Example 1 except that in Example 1, the amount of the alumina type hollow particles added, was changed from 30 parts to 110 parts. The obtained sintered body had a porosity of 88% and an average pore diameter of 35 μm. With respect to this porous product, the X-ray diffraction, measurement of the thermal expansion coefficient and measurement of the three point bending strength were carried out in the same manner as in Example 1. As a result, in the identification of crystal phases, in addition to silicon nitride, a peak of alumina was observed. Further, the thermal expansion coefficient was a low thermal expansion of $5.5 \times 10^{-6}/°$ C. within a range of from room temperature to 1000° C. The three point bending strength at room temperature was 5 MPa.

Example 3 (Comparative Example)

The operation was the same as in Example 1 except that in Example 1, no alumina type hollow particles were added. The obtained sintered body had a porosity of 20% and an average pore diameter of 1.5 μm. With respect to this porous product, the X-ray diffraction, measurement of the thermal expansion coefficient and measurement of the three point bending strength were carried out in the same manner as in Example 1. As a result, in the identification of crystal phases, no peak other than silicon nitride was observed. Further, the thermal expansion coefficient was a low thermal expansion of $3.0 \times 10^{-6}/°$ C. within a range of from room temperature to 1000° C. The three point bending strength at room temperature was 250 MPa.

Example 4 (The Present Invention)

The operation was the same as in Example 1 except that in Example 1, the average particle diameter of the metal silicon particles was changed from 50 μm to 1 μm, and the alumina type hollow particles were changed to spinel type hollow particles. The obtained sintered body had a porosity of 45% and an average pore diameter of 4 μm. With respect to this porous product, the X-ray diffraction, measurement of the thermal expansion coefficient and measurement of the three point bending strength were carried out in the same manner as in Example 1. As a result, in the identification of crystal phases, in addition to silicon nitride, a peak of spinel was slightly observed. Further, the thermal expansion coefficient was a low thermal expansion of $4.0 \times 10^{-6}/°$ C. within a range of from room temperature to 1000° C. The three point bending strength at room temperature was 60 MPa. Further, in the obtained sintered body, a remarkable deformation was observed. This is considered to be attributable to the fact that sintering proceeded remarkably due to the formed liquid phase.

Example 5 (Comparative Example)

The operation was the same as in Example 1 except that in Example 1, the average particle diameter of the metal silicon particles was changed from 50 μm to 400 μm. With respect to this porous product, the X-ray diffraction, measurement of the thermal expansion coefficient and measurement of the three point bending strength were carried out in the same manner as in Example 1. As a result, in the identification of crystal phases, in addition to silicon nitride, peaks of silicon and alumina were observed. Further, the thermal expansion coefficient was a low thermal expansion of $4.8 \times 10^{-6}/°$ C. within a range of from room temperature to 1000° C. The three point bending strength at room temperature was 25 MPa.

Example 6 (The Present Invention)

To 75 parts of metal silicon particles having an average particle diameter of 50 μm, 25 parts of calcium sulfate powder having an average particle diameter of 100 μm granulated by a spray drying method was added as hollow particles, followed by dry mixing for 30 minutes by a mixer. The obtained mixed powder was press-molded in the same manner as in Example 1. After the molding, it was heated in a nitrogen atmosphere (nitrogen pressure=0.1 MPa) in an electric furnace at a rate of 400° C./hr from room temperature to 500° C., at a rate of 60° C./hr from 500° C. to 1500° C. and at a rate of 300° C./hr from 1500 to 1600° C. and maintained at 1600° C. for 10 hours to carry out nitriding treatment.

The obtained sintered body had a porosity of 55% and an average pore diameter of 30 μm. With respect to this porous product, identification of the crystal phases was carried out by X-rays, whereby only silicon nitride was observed. With respect to this porous product, the thermal expansion coefficient was measured and found to be a low thermal expansion of $3.1 \times 10^{-6}$/° C. within a range of from room temperature to 1000° C., and the three point bending strength was 40 MPa.

Example 7 (The Present Invention)

To 80 parts of metal silicon particles having an average particle diameter of 25 μm, 20 parts of silica-type glass hollow particles having an average particle diameter of 45 μm, were added, and ethanol was further added as a disperse medium, followed by wet mixing for 30 minutes by a ball milling method, and finally by drying. The obtained mixed powder was press-molded in the same manner as in Example 1. After the molding, it was heated in a nitrogen atmosphere (nitrogen pressure=0.1 MPa) in an electric furnace at a rate of 400° C./hr from room temperature to 1100° C., maintained at 1100° C. for 10 hours, then heated to 1700° C. at a rate of 60° C./hr and maintained at 1700° C. for 5 hours to carry out heat treatment.

The obtained sintered body had a porosity of 50% and an average pore diameter of 15 μm. With respect to this porous product, the thermal expansion coefficient was measured and found to be a low thermal expansion of $2.9 \times 10^{-6}$/° C. within a range of from room temperature to 1000° C., and the three point bending strength was 55 MPa.

Example 8 (The Present Invention)

To 75 parts of metal silicon particles having an average particle diameter of 20 μm, 25 parts of silica-alumina type hollow particles having an average particle diameter of 50 μm, were added, followed by dry mixing by a mixer. To 100 parts of this mixed powder, 10 parts of methylcellulose and 10 parts of deionized water were added and thoroughly kneaded by a kneader to obtain an extrusion molding mixture, followed by extrusion molding. The obtained extrusion green body was dried by a warm air drier and then heated in a nitrogen atmosphere (nitrogen pressure=0.1 MPa) in an electric furnace at a rate of 400° C./hr from room temperature to 800° C., maintained at 800° C. for 2 hours, then heated to 1700° C. at a rate of 60° C./hr and maintained at 1700° C. for 5 hours to carry out heat treatment.

The obtained sintered body had a porosity of 60% and an average pore diameter of 18 μm. With respect to this porous product, identification of crystal phases was carried out by X-rays, whereby only silicon nitride was observed. Further, with respect to this porous product, the thermal expansion coefficient was measured and found to be a low thermal expansion of $2.9 \times 10^{-6}$/° C. within a range of from room temperature to 1000° C. The three point bending strength was 60 MPa.

Example 9 (The Present Invention)

To 70 parts of metal silicon powder having an average particle diameter of 40 μm, 30 parts of an acryl type organic spherical particles having an average particle diameter of 20 μm were added, and ethanol was further added as a disperse medium, followed by wet mixing for 2 hours by a ball milling and finally by drying. The obtained mixed powder was press-molded in the same manner as in Example 1. After the molding, it was heated in a nitrogen atmosphere (nitrogen pressure 0.1 MPa) in an electric furnace at a rate of 60° C./hr from room temperature to 500° C., then at a rate of 400° C./hr from 500° C. to 1300° C., maintained at 1300° C. for 12 hours, then heated to 1600° C. at a rate of 400° C./hr and maintained at 1600° C. for 4 hours to carry out heat treatment. With respect to the properties of the obtained sintered body, the porosity was 65%, the average pore diameter was 25 μm, and the bending strength was 10 MPa.

Example 10 (The Present Invention)

To 70 parts of metal silicon particles having an average particle diameter of 150 μm, 30 parts of silica type inorganic hollow particles having an average particle diameter of 70 μm were added, and ethanol was further added as a disperse medium, followed by wet mixing for 2 hours by a ball milling and finally by drying. The obtained mixed powder was press-molded in the same manner as in Example 1. After the molding, it was heated in a nitrogen atmosphere (nitrogen pressure=0.08 MPa) in an electric furnace at a rate of 60° C./hr from room temperature to 500° C., then heated to 1200° C. at a rate of 100° C./hr, maintained at 1200° C. for 24 hours, then further heated to 1400° C. at a rate of 400° C./hr and maintained at 1400° C. for 12 hours to carry out heat treatment.

The obtained sintered body had a porosity of 70% and an average pore diameter of 60 μm, and substantial silicon metal and silica remained in the sintered body. The thermal expansion coefficient was a high thermal expansion of $5.0 \times 10^{-6}$/° C. within a range of from room temperature to 1000° C., and the three point bending strength was 30 MPa.

Example 11 (Comparative Example)

To 90 parts of metal silicon particles having an average particle diameter of 2 μm, 5 parts of yttrium oxide having an average particle diameter of 3 μm and 5 parts of aluminum oxide having an average particle diameter of 1.5 μm, were added. Further, 50% by outer percentage of deionized water and 0.1% by outer percentage, based on the powder, of a polycarboxylic acid type dispersing agent, were added to obtain a slurry. In the slurry, a urethane resin foam of 60 mm×120 mm×30 mm was immersed and deaerated under vacuum, whereupon the urethane resin foam was taken out and dried. After drying, it was sintered in an electric furnace at 1800° C. for 4 hours in a nitrogen atmosphere (nitrogen pressure=0.2 MPa). After the sintering, the porosity of the obtained silicon nitride filter was 75%, but the formed pores were large pores with a pore diameter of 100 μm, and the strength was a low strength of 8 MPa. Further, formation of silicon carbide was observed partially in the sintered body.

Example 12 (Comparative Example)

Into toluene, 100 parts of metal silicon powder having an average particle diameter of 1 μm and 300 parts of polysilazane were added and thoroughly stirred to obtain a slurry. The obtained slurry was dried, and the obtained powder was pulverized, and further the particle size was adjusted to obtain a molding powder. In the same manner as in Example 1, it was press-molded, and then subjected to isostatic pressing (CIP) under 100 MPa. After the molding, it was heated in a nitrogen atmosphere (nitrogen pressure=0.11 MPa) at a rate of 6° C./hr from room temperature to 500° C., at a rate of 300° C./hr from 500° C. to 1200° C., maintained at 1200° C. for 6 hours, then further heated to 1400° C. at a rate of 100° C./hr and maintained at 1400° C. for 4 hours, to carry out heat treatment. The pore diameter of the obtained porous product was fine at a level of 0.5 μm, and cracks of about 10 μm were present at various portions of the sintered body.

Example 13 (The Present Invention)

To 45 parts of metal silicon particles having an average particle diameter of 50 μm, 55 parts of alumina-silica type hollow particles having an average particle diameter of 100 μm, were added, and ethanol was further added as a disperse medium, followed by wet mixing for 30 minutes by a mixer and finally by drying. The obtained mixed powder was press-molded in the same manner as in Example 1. After the molding, it was heated in a nitrogen atmosphere (nitrogen pressure=0.09 MPa) in an electric furnace at a rate of 400° C./hr from room temperature to 500° C., then at a rate of 60° C./hr from 500° C. to 1500° C., maintained at 1500° C. for 5 hours, further heated at a rate of 300° C./hr from 1500° C. to 1700° C., and maintained at 1700° C. for 5 hours, to carry out heat treatment.

The obtained sintered body had a porosity of 87% and an average pore diameter of 35 μm. With respect to this porous product, identification of crystal phases was carried out by X-rays, whereby presence of silicon nitride and mullite was observed. With respect to this porous product, the three point bending strength was measured and found to be a low strength at a level of 5 MPa.

Example 14 (The Present Invention)

To 100 parts of metal silicon particles having an average particle diameter of 3 μm, 30 parts of acrylic resin particles having an average particle diameter of 20 μm, were added and mixed for 2 hours by a ball milling using ethyl alcohol as a disperse medium. After the drying, this powder was filled in a press mold of 40 mm×60 mm and press-molded under a molding pressure of 19.6 MPa to obtain a green body having a thickness of 10 mm. The green body was heated in a nitrogen atmosphere (nitrogen pressure=0.1 MPa) in an electric furnace at a rate of 60° C./hr from room temperature to 500° C., then at a rate of 400° C./hr from 500° C. to 1300° C., maintained at 1300° C. for 12 hours, then heated to 1600° C. at a rate of 400° C./hr and maintained at 1600° C. for 4 hours, to carry out heat treatment.

With respect to the properties of the obtained sintered body, the porosity was 55%, the average pore diameter was 10 μm, and the nitriding ratio was 95%. Further, from the sintered body, a bending test specimen having a size of 4 mm×3 mm×40 mm was cut out, and the three point bending strength with a span of 30 mm was measured at room temperature. The load-applying rate was 0.5 mm/min. As a result, the bending strength was 19.6 MPa.

Example 15 (The Present Invention)

The operation was the same as in Example 14 except that in Example 14, the time for maintaining at 1300° C. was changed from 12 hours to 4 hours, and the time for maintaining at 1600° C. was changed from 4 hours to 1 hour. With respect to the properties of the obtained sintered body, the porosity was 50%, the average pore diameter was 8 μm, and the nitriding ratio was 96%. Further, the three point bending strength measured in the same manner as in Example 1, was 21.6 MPa.

Example 16 (The Present Invention)

The operation was the same as in Example 14 except that in Example 14, the acrylic resin particles having an average particle diameter of 20 μm were changed to vinyl acetate resin particles having an average particle diameter of 60 μm. With respect to the properties of the obtained sintered body, the porosity was 53%, the average pore diameter was 20 μm, and the nitriding ratio was 95%. Further, the three point bending strength measured in the same manner as in Example 1 was 14.7 MPa.

Example 17 (The Present Invention)

The operation was the same as in Example 14 except that in Example 14, the amount of the acrylic resin particles added, was changed from 30 parts to 50 parts. With respect to the properties of the obtained sintered body, the porosity was 75%, the average pore diameter was 15 μm, and the nitriding ratio was 93%. Further, the three point bending strength measured in the same manner as in Example 1 was 9.8 MPa.

Example 18 (The Present Invention)

To 100 parts of metal silicon particles having an average particle diameter of 5 μm, 50 parts of acrylic resin particles having an average particle diameter of 100 μm, were added, and mixed for 2 hours by a ball milling using ethyl alcohol as a disperse medium. After drying, this powder was filled in a press-mold of 40 mm×60 mm and press-molded under a molding pressure of 19.6 MPa to obtain a green body having a thickness of 10 mm. The green body was heated in a nitrogen atmosphere (nitrogen pressure=0.098 MPa) in an electric furnace at a rate of 60° C./hr from room temperature to 1000° C., then at a rate of 400° C./hr from 1000° C. to 1350° C., maintained at 1350° C. for 12 hours, then heated to 1700° C. at a rate of 400° C./hr and maintained at 1700° C. for 4 hours, to carry out heat treatment. With respect to the properties of the obtained sintered body, the porosity was 75%, the average pore diameter was 19.5 μm, and the nitriding ratio was 98%. Further, the three point bending strength measured in the same manner as in Example 1, was 3.9 MPa.

Example 19 (The Present Invention)

To 100 parts of metal silicon particles having an average particle diameter of 1.5 μm, 40 parts of acrylic resin particles having an average particle diameter of 50 μm, were added, and mixed for 2 hours by a ball milling using ethyl alcohol as a disperse medium. After drying, this powder was filled in a press mold of 40 mm×60 mm and press-molded under a molding pressure of 19.6 MPa to obtain a green body having a thickness of 10 mm. The green body was heated in a nitrogen atmosphere (nitrogen pressure=0.11 MPa) in an electric furnace at a rate of 60° C./hr from room temperature to 50° C., then at a rate of 400° C./hr from 500° C. to 1200° C., maintained at 1200° C. for 12 hours, then heated to 1750° C. at a rate of 400° C./hr and maintained at 1750° C. for 2 hours, to carry out heat treatment. With respect to the properties of the obtained sintered body, the porosity was 65%, the average pore diameter was 15 μm, and the nitriding ratio was 99%. Further, the three point bending strength measured in the same manner as in Example 1 was 10.8 MPa.

Example 20 (The Present Invention)

To 100 parts of metal silicon particles having an average particle diameter of 40 μm, 30 parts of acrylic resin particles having an average particle diameter of 20 μm, were added, and mixed for 2 hours by a ball milling using ethyl alcohol as a disperse medium. After drying, this powder was filled in a press mold of 40 mm×60 mm and press-molded under a molding pressure of 19.6 MPa to obtain a green body having a thickness of 10 mm. The green body was heated in a nitrogen atmosphere (nitrogen pressure=0.2 MPa) in an electric furnace at a rate of 60° C./hr from room temperature to 500° C., then at a rate of 400° C./hr from 500° C. to 1300° C., maintained at 1300° C. for 12 hours, then heated to 1600° C. at a rate of 400° C./hr and maintained at 1600° C. for 4 hours, to carry out heat treatment. With respect to the properties of the obtained sintered body, the porosity was 65%, the average pore diameter was 25 μm, and the nitriding ratio was 85%. Further, the three point bending strength measured in the same manner as in Example 1 was 9.8 MPa.

Example 21 (The Present Invention)

To 100 parts of metal silicon particles having an average particle diameter of 100 μm, 30 parts of acrylic resin particles having an average particle diameter of 50 μm, were added, and mixed for 2 hours by a ball milling using ethyl alcohol as a disperse medium. After drying, this powder was filled in a press mold of 40 mm×60 mm and press-molded under a molding pressure of 19.6 MPa to obtain a green body having a thickness of 10 mm. The green body was heated in a nitrogen atmosphere (nitrogen pressure=0.1 MPa) in an electric furnace at a rate of 60° C./hr from room temperature to 500° C., then at a rate of 400° C./hr from 500° C. to 1300° C., maintained at 1300° C. for 12 hours, then heated to 1600° C. at a rate of 400° C./hr and maintained at 1600° C. for 4 hours, to carry out heat treatment. With respect to the properties of the obtained sintered body, the porosity was 70%, the average pore diameter was 45 μm, and the nitriding ratio was 50%. Further, the three point bending strength measured in the same manner as in Example 1, was 4.9 MPa.

Example 22 (Comparative Example)

The operation was the same as in Example 14 except that in Example 14, no acrylic resin particles were added. With respect to the properties of the obtained sintered body, the porosity was 20%, the average pore diameter was 1 μm, and the nitriding ratio was 95%. Further, the three point bending strength measured in the same manner as in Example 1, was 196 MPa.

Example 23 (The Present Invention)

A mixture obtained by blending 45 parts of metal silicon particles having an average diameter of 50 μm, 14 parts of alumina-silica type hollow particles having an average particle diameter of 45 μm, 9 parts of methyl cellulose as a binder, 1.5 parts of a lubricant and 30.5 parts of water, was kneaded by a kneader and then molded into a honeycomb shape by an extrusion molding machine and dried. Then, both end surfaces were sealed in a checkered pattern so that the gas inlet side and gas outlet side would be alternating, followed by drying again. This green body was heated in a nitrogen atmosphere (nitrogen pressure=0.15 MPa) at a rate of 60° C./hr from room temperature to 800° C., maintained at 800° C. for 2 hours, then heated at a rate of 120° C./hr from 800° C. to 1350° C., and maintained at 1350° C. for 8 hours, then heated at a rate of 300° C./hr from 1350° C. to 1700° C. and maintained at 1700° C. for 4 hours, to carry out heat treatment. After the heat treatment, a silicon nitride honeycomb filter (hereinafter referred to simply as a honeycomb filter) having a diameter of about 60 μm and a length of 150 mm and a cell density of 280 cells/6.45 cm² at both end surfaces, was obtained.

The properties of this honeycomb filter were measured, whereby the porosity was 56%, the average pore diameter was 10 μm, the thermal expansion coefficient was $2.8 \times 10^{-6}/°C.$, Young's modulus was 70 GPa, and the 1 μm pore volume ratio was 7%.

On the surface of each cell of the obtained honeycomb filter, an oxidation catalyst to burn arrested particulates, made of a noble metal element such as platinum, other metal element or oxide, was supported to obtain a filter for particulates.

This honeycomb filter was maintained in a metal casing and then set in an intermediate position of the exhaust gas pipe from the engine, so that the exhaust gas flowed in the honeycomb filter in a wall flow fashion in the above-mentioned filter for particulates, whereby the exhaust gas from the engine could be cleaned by the honeycomb filter. Regeneration of the honeycomb filter is carried out when the arrested particulates reached a predetermined amount by heating, burning and removing the particulates by an attached heating means.

The performance of this honeycomb filter as a particulate filter was evaluated with respect to the pressure loss change, the particulate-arresting performance and the thermal shock resistance.

Firstly, the pressure loss change was calculated by $\Delta P(kPa \cdot s/cm) = \Delta P_1 - \Delta P_0$, by measuring the initial pressure loss $\Delta P_0$ before use and the pressure loss $\Delta P_1$ after use. The initial pressure loss $\Delta P_0$ was measured by supplying nitrogen gas at a flow rate of 0.23 m³/min to the honeycomb filter before use maintained in the metal casing. The pressure loss $\Delta P_1$ after use was measured in the same manner with respect to the one used for one hour after starting the engine.

The particulate arresting performance was judged by the amount of particulates in the exhaust gas (hereinafter referred to as cleaned gas) passed through the honeycomb filter upon expiration of 30 minutes from the start of the engine. Namely, the smaller the amount of particulate in the cleaned gas, the higher the particulate-arresting performance of the filter.

Specifically, a part of the cleaned gas was withdrawn by a gas aspirator (True-Spot Smoke Tester, trade name, manufactured by BACHARACH Company), and the amount of particulates deposited on a white filter paper set in the above gas aspirator, was visually evaluated in six grades by comparison with the attached scale. The state wherein the amount of particulates in the cleaned gas is minimum and no particulate is deposited on the filter paper (the filter paper remains to be white), is judged to be 1. On the other hand, the state wherein the particulates are deposited over the entire surface of the filter paper, and the entire surface is black, is judged to be 6.

Further, for the thermal shock resistance, only one end of the honeycomb filter before use was heated, and the temperature difference ΔT (° C.) between both ends when cracks were formed in the honeycomb filter, was measured.

The evaluation results in a case where the above filter was used as a filter for an exhaust gas-cleaning apparatus, are shown in Table 1.

In the Table, filter 1 is the above filter, and filter 2 and filter 3 are honeycomb filters made of silicon carbide having the same shape. With respect to the properties of filter 2, the porosity was 38%, the average pore diameter was 31 μm, the thermal expansion coefficient was $4.2 \times 10^{-6}/°$ C., the Young's modulus was 220 GPa, and the 1 μm pore volume ratio was 0.1%, and with respect to the properties of filter 3, the porosity was 48%, the average pore diameter was 9 μm, the thermal expansion coefficient was $4.2 \times 10^{-6}/°$ C., the Young's modulus was 250 GPa, and the 1 μm pore volume ratio was 0.5%.

TABLE 1

|  | Thermal shock resistance ΔT | Pressure loss change ΔP | Particulate arresting performance |
|---|---|---|---|
| Filter 1 | 500 | 0.2 | 1 |
| Filter 2 | 300 | 0.3 | 3 |
| Filter 3 | 350 | 0.7 | 1 |

Industrial Applicability

By the method for producing a silicon nitride filter of the present invention, it is possible to produce a silicon nitride filter which has properties excellent in e.g. heat resistance, thermal shock resistance, corrosion resistance, chemical resistance and mechanical strength and which is suitable as a dust arresting and dust removing filter at a high temperature or in a corrosive atmosphere.

Further, the silicon nitride filter of the present invention not only has heat resistance, corrosion resistance, and acid resistance, but also has a low Young's modulus and thus is excellent in thermal shock resistance. Further, it has an average pore diameter suitable for arresting particulates, etc., and also has a high porosity and mechanical strength, whereby it is most suitable as a filter for particulates.

The entire disclosures of Japanese Patent Application No. 11-366305 filed on Dec. 24, 1999, and Japanese Patent Application No. 11-366306 filed on Dec. 24, 1999 including specifications, claims and summaries are incorporated herein by reference in their entireties.

What is claimed is:

1. A method comprising,
    heat treating in nitrogen a green body comprising from 40 to 90 mass % of metal silicon particles having an average particle diameter of from 1 to 30 μm and from 10 to 50 mass % of a pore-forming agent to from a porous product comprising substantially silicon nitride by converting the metal silicon to silicon nitride,
    wherein heat-treating comprises
        first maintaining the green body in a nitrogen atmosphere at a temperature of from 1,000 to 1,400° C. for from 5 to 24 hours, and then
        maintaining the green body at a temperature of from 1,450 to 1,800° C. for from 2 to 5 hours:
            wherein the total amount of metal silicon particles and pore-forming agent in the green body is at least 90 mass %, and
            wherein the pore-forming agent decomposes during heat treatment.

2. The method of claim 1, wherein the porous product formed by heat treating the green body comprises at least 90 mass % of silicon nitride based on the total amount of silicon in the porous product.

3. The method of claim 1, wherein the green body is heat treated to form a porous product having a porosity of from 30 to 80%.

4. The method of claim 1, wherein the average pore diameter of the porous product is from 5 to 20 μm as measured by a mercury immersion method.

5. The method of claim 1, wherein the pore-forming agent is an organic polymer particle.

6. The method of claim 5, wherein the organic polymer is selected from the group consisting of polyvinyl alcohol, acrylic resin, vinyl acetate resin and cellulose.

7. The method of claim 1, wherein the pore-forming agent is an acrylic resin particle.

8. The method of claim 1, wherein the pore-forming agent is spherical.

9. The method of claim 1, further comprising
    mixing the metal silicon particles and the pore-forming agent in a volatile medium to form a wet mixture, and
    drying the wet mixture before the heat-treating.

10. The method of claim 1, further comprising
    filling a mold with a mixture of the silicon metal particles and the pore-forming agent, and
    press molding before the heat-treating.

11. The method of claim 1, wherein the green body comprises 100 parts of metal silicon particles having an average particle diameter of 3 μm and 30 parts of acrylic resin particles having an average particle diameter of 20 μm.

12. The method of claim 1, further comprising
    extrusion molding before the heat treating.

13. A method comprising,
    heat treating in nitrogen a green body 100 parts of metal silicon particles having an average particle diameter of 3 μm and 30 parts of acrylic resin particles having an average particle diameter of 20 μm to form a porous product comprising substantially silicon nitride by converting the metal silicon to silicon nitride
    wherein the total amount of metal silicon particles and acrylic resin particles in the green body is at least 90 mass %, and
    wherein the pore-forming agent decomposes during heat treatment.

14. The method of claim 13, wherein the porous product formed by heat treating the green body comprises at least 90 mass % of silicon nitride based on the total amount of silicon in the porous product.

15. The method of claim 13, wherein the green body is heat treated to form a porous product having a porosity of from 30 to 80%.

16. The method of claim 13, wherein the average pore diameter of the porous product is from 5 to 20 μm as measured by a mercury immersion method.

17. The method of claim 13, wherein the heat-treating comprises
    first maintaining the green body in a nitrogen atmosphere at a temperature of from 1,000 to 1,400° C. for from 5 to 24 hours, and then
    maintaining the green body at a temperature of from 1,450 to 1,800° C. for from 2 to 5 hours.

18. The method of claim 13, wherein the acrylic resin particles are spherical.

19. The method of claim 13, further comprising
    mixing the metal silicon particles and the acrylic resin particles in a volatile medium to form a wet mixture, and
    drying the wet mixture before the heat-treating.

20. The method of claim 13, further comprising
    filling a mold with a mixture of the silicon metal particles and the acrylic resin particles, and
    press molding before the heat-treating.

21. The method of claim 13, further comprising
    extrusion molding before the heat treating.

* * * * *